Figure 2:
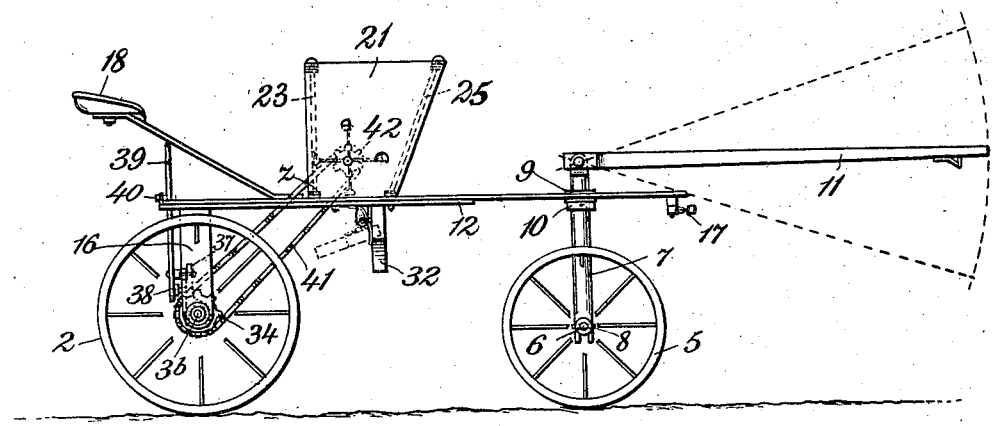

No. 896,178. PATENTED AUG. 18, 1908.
F. A. TUTTLE.
BROADCAST SEEDER.
APPLICATION FILED JULY 6, 1906.
4 SHEETS—SHEET 1.
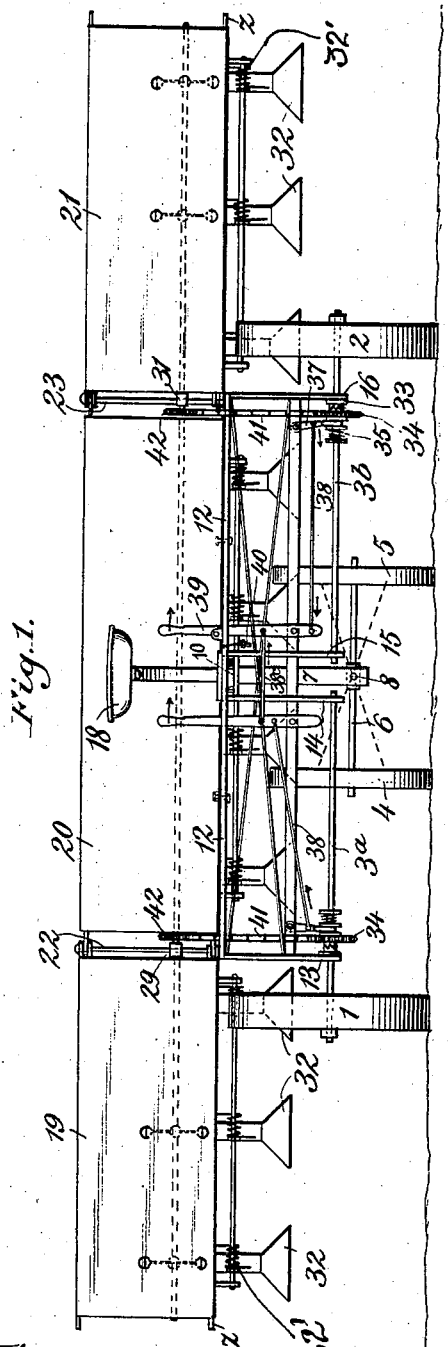
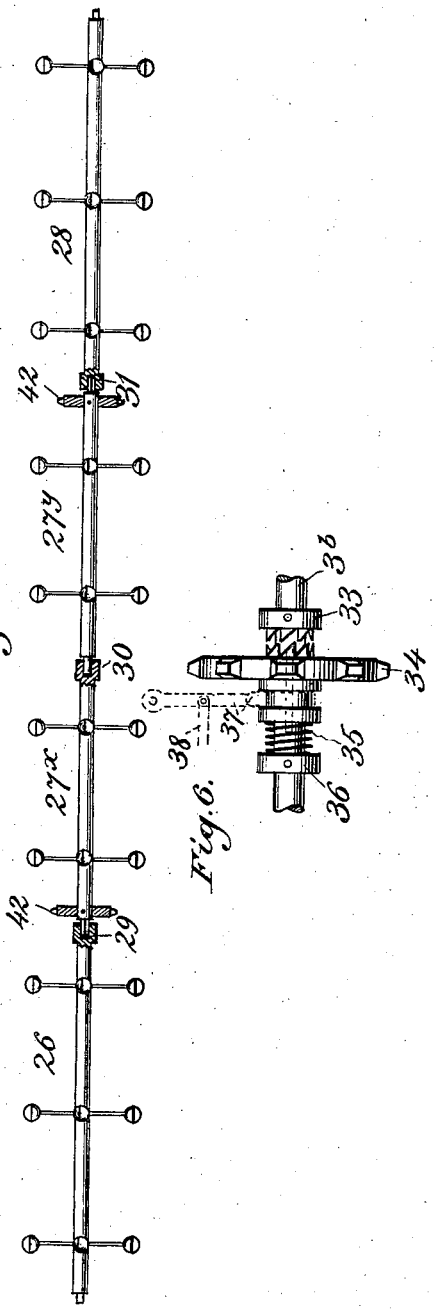
Witnesses:
Inventor:
Fred. A. Tuttle No. 896,178.

PATENTED AUG. 18, 1908.

F. A. TUTTLE.
BROADCAST SEEDER.
APPLICATION FILED JULY 6, 1906.

4 SHEETS—SHEET 2.

Witnesses:

Inventor:
Fred. A. Tuttle

No. 896,178. PATENTED AUG. 18, 1908.
F. A. TUTTLE.
BROADCAST SEEDER.
APPLICATION FILED JULY 6, 1906.

4 SHEETS—SHEET 3.

Witnesses
Inventor.
Fred. A. Tuttle

No. 896,178. PATENTED AUG. 18, 1908.
F. A. TUTTLE.
BROADCAST SEEDER.
APPLICATION FILED JULY 6, 1906.

4 SHEETS—SHEET 4.

Witnesses:

Inventor:
Fred. A. Tuttle

UNITED STATES PATENT OFFICE.

FREDERICK ALBERT TUTTLE, OF NAAUSAY TOWNSHIP, KENDALL COUNTY, ILLINOIS.

BROADCAST SEEDER.

No. 896,178.  Specification of Letters Patent.  Patented Aug. 18, 1908.

Application filed July 6, 1906. Serial No. 325,021.

*To all whom it may concern:*

Be it known that I, FREDERICK ALBERT TUTTLE, a citizen of the United States of America, residing in the township of Naausay, in the county of Kendall and State of Illinois, have invented a new and useful Improvement in Broadcast Seeders, of which the following is a specification.

My invention relates to improvements in a broad cast seeder, and the objects of my improvements are:

1st. To provide a broadcast seeder with a sectional seed box pivotally connected, mounted on a solid frame consisting of three sections that may be operated by using one, two or three sections at one operation. This construction avoiding all inconveniences of operating the entire machine at one operation, which is necessitated by using the common seeders, having a solid seed box and a solid main frame or a sectional seed box not pivotally connected, mounted on a sectional or jointed frame.

2nd. To provide a broad cast seeder with a wide sectional seed box consisting of three sections whose outside section may be independently expanded or contracted or folded independently of the main frame when required for use and folded when not in use or while being transported from the implement house to the field or from the field to the implement house, etc. This construction avoiding all inconveniences of: (A) folding or contracting; (B) passing through narrow gates or roadways, etc.; (C) meeting obstructions such as stumps, rocks, etc.; (D) economizing room in the farm yard or implement house after the seeding season has expired; and (E) using a seeder two or three times as wide as those in common use, which is necessitated by the use of the common seeder, having a solid seed box mounted upon a solid frame or a jointed seed box and a jointed main frame combined.

3rd. To provide a broadcast seeder with a sectional force feed mechanism mounted in the bottom of said seed box paralled with said box consisting of a shaft, etc. of two independent sections and a rear truck axle consisting of two independent sections also which drives the corresponding independent sections of said force feed mechanism independently by means of two similar chain driving clutches, etc. this construction avoiding all inconveniences of the uneven sowing of grain when the broadcast seeder is traveling around the curves caused by the outside of the seeder traveling over more ground than the inside, consequently sowing less grain in proportion to the surface on the outside than on the inside surface which is necessitated by the use of the common seeders having a solid force feed grain wheel shaft driven by a single axle or truck wheel.

4th. To provide a broadcast seeder mounted on a rear truck and a forward caster truck having wide tires with a wide sectional seed box having a capacity of about sixty bushels that may be filled with a wagon, consequently dispensing with the use of bags or baskets that is capable of sowing about one hundred acres a day that requires only one man and a team to operate it. This construction avoiding all inconveniences of lost time, labor, etc. which is necessitated by the use of the common small seeders mounted on only two wheels having comparatively narrow tires that have a solid seed box having a capacity of about five bushels, that must be frequently stopped and filled with a bag or a basket, consequently consuming a large part of the time, that is capable of only sowing about twenty-five acres of grain in a day or about one-fourth as much as is done by the aforesaid broadcast seeder.

5th. To provide a broadcast seeder with a caster truck to guide and support the forward end of the main frame of said broad cast seeder. This construction avoiding all inconveniences of: (A) guiding; (B) sidedraft on the team; (C) tilting backward or forward when the team is removed; and (D) the additional strain on the horses' necks to keep the machine in a horizontal position which is necessitated by the use of the common broad cast seeders that are mounted on two truck wheels alone or two solid truck wheels and one or more independent caster truck wheels that are not connected with the horse guiding tongue.

6th. To construct the improvements above enumerated so that they will add to the effectiveness of the implement and simplify the means employed for manipulating the several parts of the implement and also effect a reduction in the cost of construction.

I attain these objects by mechanisms illustrated in the accompanying drawings in which—

Figure 3:
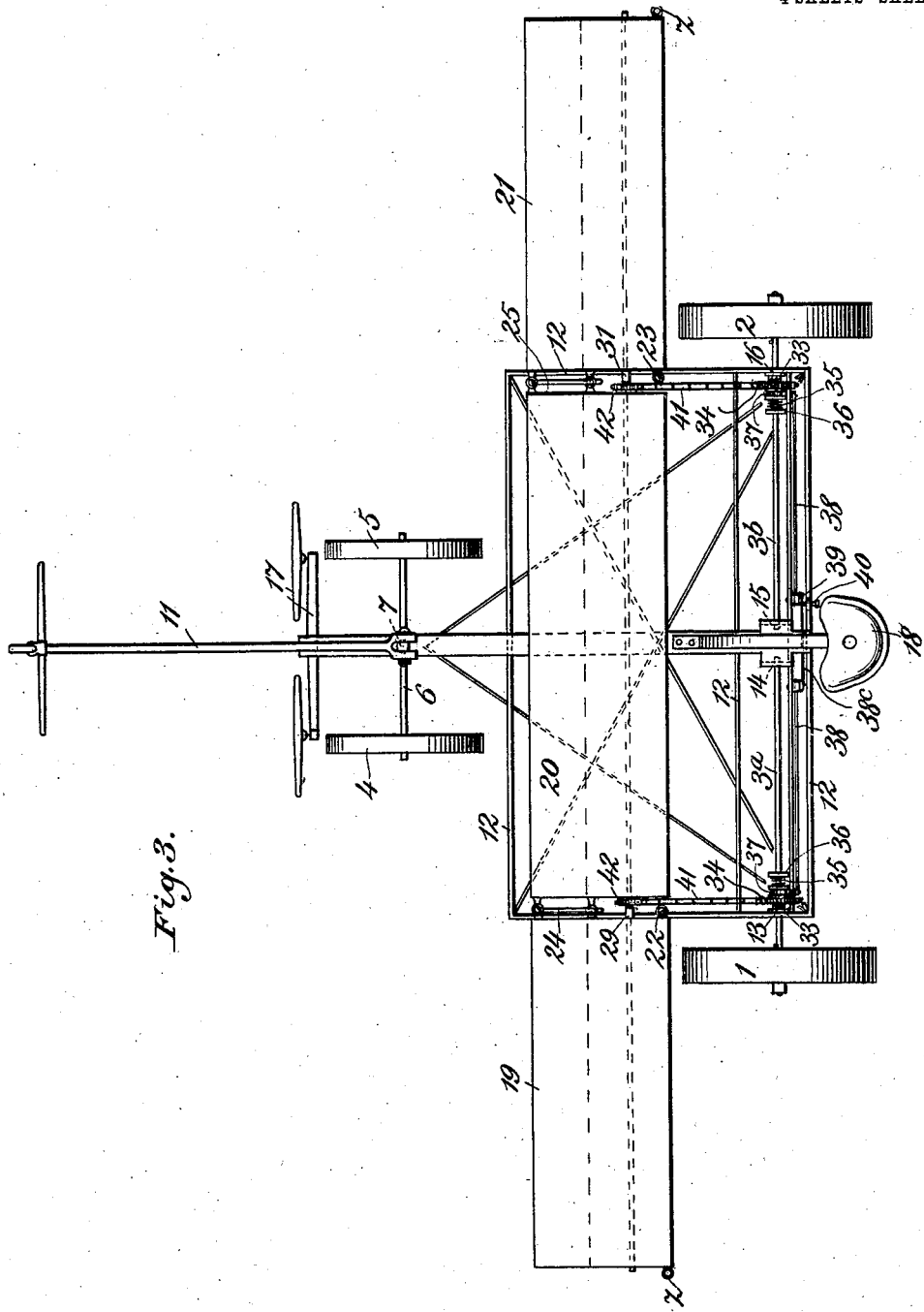
Figure 4:
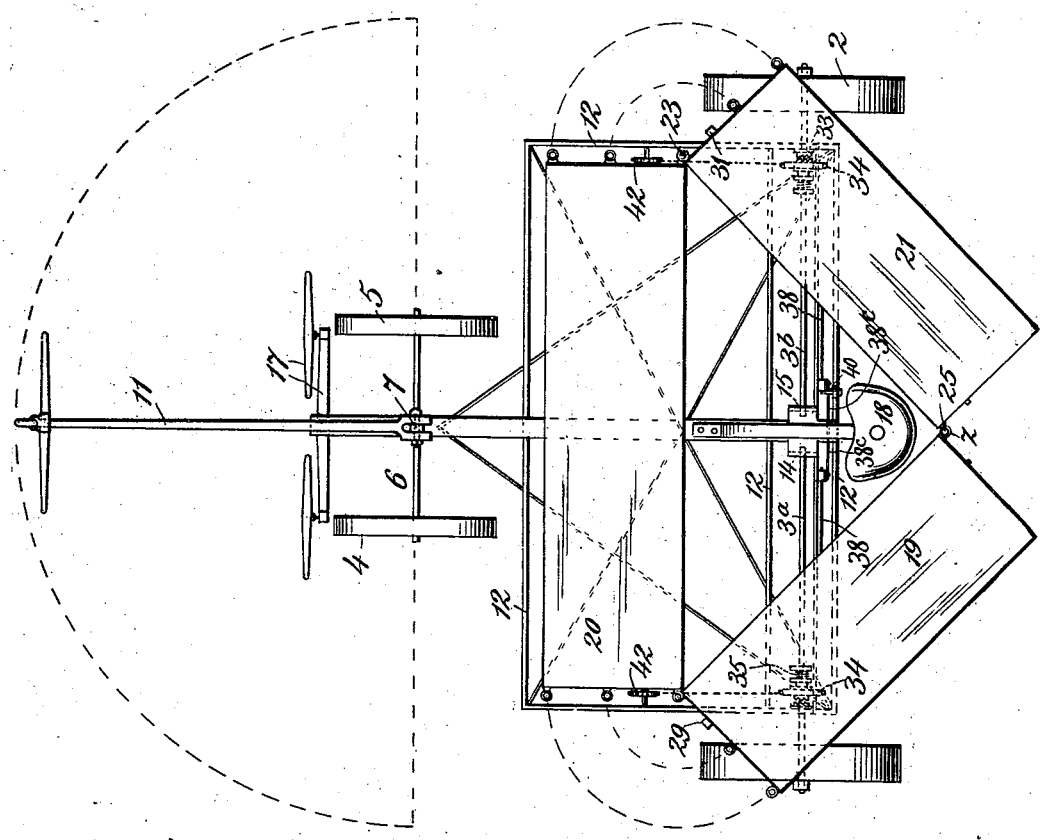

Figure 1 is a rear view of the entire machine in which dotted lines illustrate the range of oscillation of the caster truck and also the location of the feed force mechanism in the bottom of the seed box. Fig. 2 is a right hand side view of the entire machine in which the dotted lines illustrate the range of oscillation of the horse guiding tongue. Fig. 3 is a top view of the entire machine in which the dotted lines illustrate the location of the force feed grain wheel shaft in the seed box. Fig. 4 is another top view of the entire machine illustrating the end sections as being turned backwards to permit the machine to pass through ordinary gates or roadways, dotted lines illustrate the range of oscillation of the caster truck, etc. Fig. 5 is a plan, partly in section, of the feed shaft referred to. Fig. 6 is a detail of a clutch controlling the operation of the feed shaft.

Similar letters or figures refer to similar parts throughout the several views.

The sectional rear truck upon which the rear end of the main frame is firmly mounted consists of a pair of wheels 1 and 2 on a rear truck axle consisting of two independent sections 3$^a$ and 3$^b$, said truck wheels 1 and 2 being keyed to said truck axles 3$^a$ and 3$^b$ respectively, in order to transmit motion to the feed devices at each side independently.

A forward caster truck upon which the forward end of the main frame is pivotally mounted consists of a pair of wheels 4 and 5 on an axle 6. A vertical shaft 7 has its lower end pivotally connected to the middle of the caster truck axle 6 by means of a pivot pin 8 passing through said axle and said vertical shaft. Said shaft extends upwards from said axle through a journal 9 in the front end of the main frame, a collar 10 attached to said shaft under the lower end of said journal forming a pivotal support for the front end of the main frame, and a tongue 11 is pivotally attached to the shaft at the upper end. The object of said caster truck is to pivotally support and guide the front end of the machine instead of having the front end of said seeder supported by the horses' necks; also to insure a steadier motion to the seeder when traveling over rough ground.

The main rectangular frame 12 consists of bars and braces arranged as shown in the drawing, and said frame has its rear end firmly mounted upon the rear truck by means of journals 13 and 14 and 15 and 16 through which the rear truck axle sections respectively extend. Said frame has its forward end pivotally mounted on the caster truck as above described. A set of whiffle trees 17 is attached to the forward end of said main frame. An operator's seat 18 is mounted on the rear end of said main frame. The object of said main frame is to form a support for the entire machine.

A sectional seed box is mounted upon the main frame by means of bolts passing through the main frame and the center section of the seed box, said seed box consisting of three sections 19, 20 and 21, the end sections 19 and 21 being hinged to the middle one by means of two upright pivot bolts 22 and 23 passing through the eyes in the corresponding ends of the sections respectively as illustrated in the drawing, said end sections being locked in a working position or in a straight line with the middle section by means of two bolts 24 and 25 passing through the eyes in the corresponding ends of the section respectively. Said end section may be locked in a folded or idle position by means of one of the bolts 24 or 25 after being withdrawn from its former position, being put through the eyes $z$ in the outer end sections respectively, as illustrated in the drawing in Fig. 4.

A sectional feed mechanism is mounted in the bottom of the seed box by means of journals in each end of the sections of said seed box respectively and consists of four shaft sections 26, 27$^x$, 27$^y$ and 28 corresponding in length with sections of the seed box respectively; said shaft has joints at its opposite and corresponding ends, and at the middle of the middle section, as shown at 30, and the outer ends of the sections 27$^y$ are provided with square ends so as to extend into the square holes 29 and 31 in the corresponding ends of the end section. The inner end of section 27$^x$ is provided with a journal in which the corresponding end of section 27$^y$ extends, the whole forming a shaft of two independent sections as described. Consequently said sections form a solid shaft when the seed box is in a straight line; otherwise a broken shaft. The shaft has a series of feed grain cup wheels mounted upon it above the scattering spouts respectively, the object of which is to force the seed to the scattering spouts at a steady rate.

A series of scattering spouts 32 are mounted pivotally on a sectional shaft attached to the front side of the bottom of said feed box adjacent to the corresponding feed wheels in the seed box, and said spouts are held in the proper position by springs 32' which allow the spouts to yield when they strike obstructions such as rocks, stumps, etc. Such of said spouts as would come in contact with the main frame or rear truck wheels when the end sections of the seed box are turned backward as shown in the drawings Fig. 4, are pushed aside or removed at that time.

A separate chain driving clutch is mounted on the outer end of the axles 3$^a$ and 3$^b$ respectively, adjacent to the journals 13 and 16 of the main frame, and said clutch consists of a collar, 33 keyed to the rear truck axle and having teeth engaging corresponding teeth on a sprocket wheel 34 mounted upon the shaft beside the collar when the machine is put in gear by the hand lever 39, said wheel having its hub on the opposite side provided with a groove in which the yoke lever 37 projects. A coil spring 35 mounted on the rear truck axle in close proximity to the clutch wheel holds the clutch in gear and a collar 36 keyed on the axle of said rear truck holds the spring in place. The yoke is pivoted upon the main frame, and is connected by a rod 38 to a hand lever 39 mounted upon the main frame, connecting rod 38 being used to connect the hand lever on the opposite side so that they may be used as one lever when it is desired to operate both sides of the seeder at once, said connecting rod being withdrawn when it is desired to operate only one side. A lock pin 40 is mounted on the main frame adjacent to the top of the hand lever to hold said hand lever out of gear, an endless sprocket chain 41 and a sprocket wheel 42 mounted on the outer ends of the middle section 27$^x$ and 27$^y$ of the feed shaft transmits motion to the sections of the shaft independently, from the rear truck wheels respectively, at the will of the operator.
I claim:

1. The combination with an implement frame, of a truck axle and wheels, a vertical shaft having a pivotal connection at its lower end to the middle of said axle, permitting said axle to swing in a lateral vertical plane to vary its angle with respect to said shaft, a pivotal support on the shaft for the main frame, and a tongue connected to the upper end of the shaft.
2. The combination in a seeder, of a main frame, a middle seed box section mounted thereon, an end seed-box section hinged to each end of the middle section to swing horizontally, and means to feed seed from said section.

3. The combination, in a seeder, of a main frame, a middle seed box mounted thereon, end seed boxes hinged to the middle box, a feed shaft formed in sections extending across said boxes, the shaft having two end parts movable independently, and independent means to drive each part.

4. The combination, in a seeder, of a main frame, separate axle sections upon which the frame is mounted, a seed box on the frame, a feed shaft extending across the box and formed with two parts independently movable, and gearing between the axle sections and the parts of the shaft, respectively.

5. The combination, in a seeder, of a main frame, separate axle sections upon which the frame is mounted, a seed box on the frame, a feed shaft extending across the box and formed with two parts independently movable, and gearing between the axle sections and the parts of the shaft, respectively, including separate clutches.

6. The combination in a seeder, of a main frame, a middle seed box mounted thereon, end seed boxes hinged to the ends of the middle box and arranged to swing horizontally around behind the same when folded, means to fasten the folded boxes in either straight or folded position, and means to feed seed from the boxes.

FRED. ALBERT TUTTLE.

Witnesses:
A. J. VINSON,
FRED W. WALTER.